Sept. 10, 1946.  E. G. JOHANSSON  2,407,372
DISCONNECT FOR ELECTRICAL TERMINAL BLOCKS
Filed Jan. 6, 1945  2 Sheets-Sheet 1
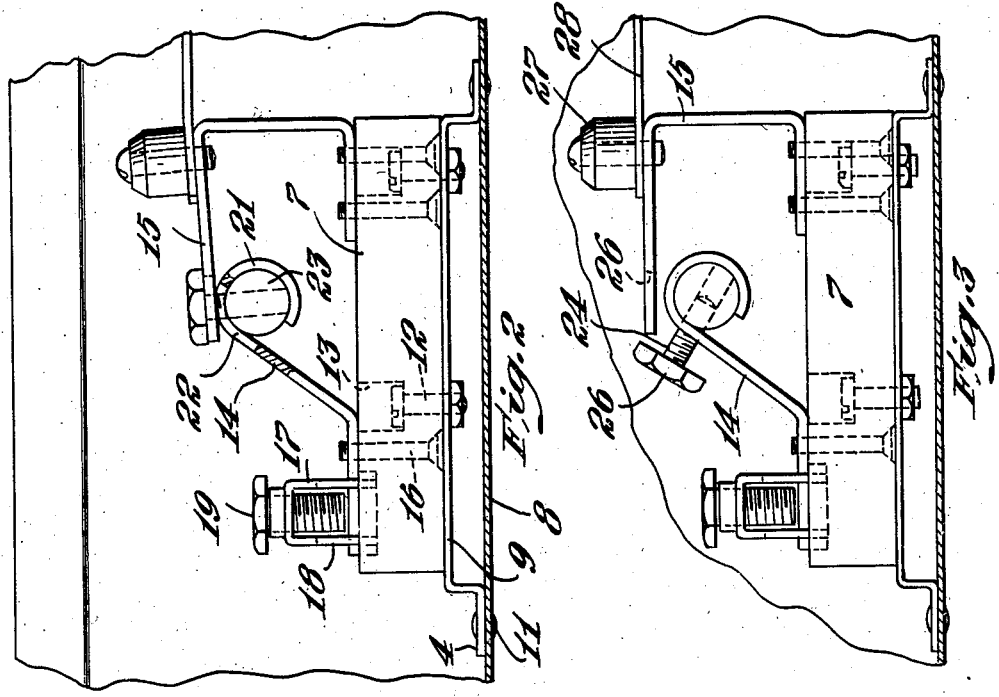
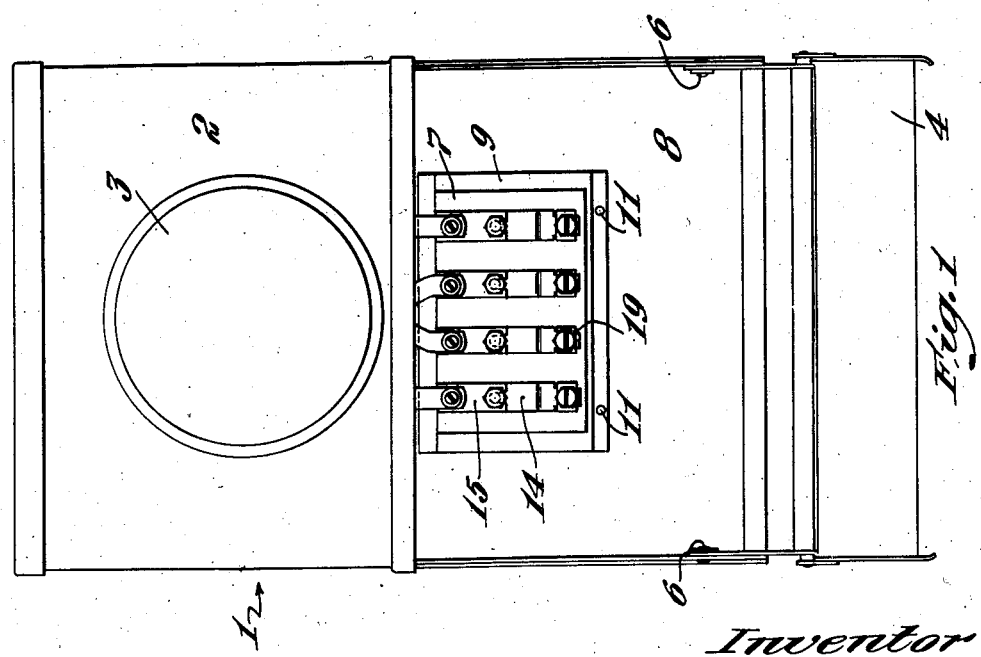
Inventor
Ernest G. Johansson
by Roberts, Cushman & Grover
att'ys.

Sept. 10, 1946.    E. G. JOHANSSON    2,407,372
DISCONNECT FOR ELECTRICAL TERMINAL BLOCKS
Filed Jan. 6, 1945    2 Sheets-Sheet 2

Inventor
Ernest G. Johansson
by Roberts, Cushman & Grover
Att'ys.

Patented Sept. 10, 1946

2,407,372

UNITED STATES PATENT OFFICE 2,407,372

DISCONNECT FOR ELECTRICAL TERMINAL BLOCKS

Ernest G. Johansson, Belmont, Mass., assignor to Anchor Manufacturing Company, Boston, Mass., a corporation of Massachusetts Application January 6, 1945, Serial No. 571,615

11 Claims. (Cl. 200—153)

In meter boxes for service entrance installations and the like it is customary to provide a test block for use in testing the meter from time to time. In making these tests the service wires and load wires are temporarily disconnected from the meter while it is being tested.

Objects of the present invention are to provide a test block which is simple and economical in construction, which is efficient and facile in use, which permits the meter to be disconnected quickly and easily, which minimizes the danger of short-circuit or injury to the operator, which can be repaired without disassembling the entire block, which provides good electrical conductivity without danger of overheating, and which is generally superior to prior test blocks.

According to the present invention the block comprises two conductors, preferably in the form of straps, means for supporting the conductors in spaced overlapping relationship, a connector pivotally mounted on one conductor to swing into and out of conducting position relative to the other conductor, a head on the connector which overlaps the second conductor when the connector is swung into said conducting position, and means on the connector for moving the head so that the first conductor can clamp the second conductor between the head and the first conductor, one of the conductors being flexible to permit it to move toward the other conductor in response to said movement of the head.

Preferably the connector comprises two heads and a connecting shank joined to one head by a threaded connection, one head being cylindrical and one conductor having a cylindrical bearing in which the cylindrical head rotates to swing the other head into and out of overlapping relation to the other conductor, the threaded connection serving as the aforesaid means for moving one head toward the other head. In the preferred embodiment the cylindrical bearing is formed by bending one of the strap conductors into cylindrical form and the shank extends through a circumferential slot in the bearing and threads into the cylindrical head, whereby the cylindrical head may be slipped endwise out of the cylindrical bearing after the shank has been threaded out of the cylindrical head. This permits ready replacement or repair of the parts subjected to the most wear.

For the purpose of illustration typical embodiments of the invention are shown in the accompanying drawings in which Fig. 1 is a front elevation of a meter box with the front cover open;

Fig. 2 is a side elevation of the test block with its conductors held in contact with each other by the connector;

Fig. 3 is a similar view showing the connector in open circuit position;

Figure 4:
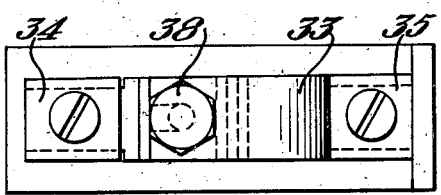
Figs. 4 and 5 are top and side views of a modified test block.

The particular embodiment of the invention illustrated in Figs. 1, 2 and 3 comprises a meter box 1 having the upper portion of its front side closed by a wall 2 provided with an opening through which projects the glass cover 3 of the meter and having a door 4 to close the lower portion of its front side, the door being hinged to the sides of the box at 6 so as to swing downwardly to the open position shown in Fig. 1.

The test block mounted in the lower portion of the box comprises a block 7 of insulation mounted on the back 8 of the box through the medium of a metal plate 9 which is secured to the back by means of rivets 11. The block 7 is secured to the plate 9 by means of bolts 12 having their heads seating in recesses 13 in the front side of the block. Mounted on the front side of the block are four pairs of conductors 14 and 15, the conductors being held in place by screws 16 extending through the block from the back and threading into the portions of the conductors which engage the front of the block.

Mounted on each conductor 14 is a U-shaped member 17 having its legs extending into a recess in the front of the block 7 and having openings 18 in its legs to receive the conductor 14. Threaded into the yoke is a screw 19 adapted to clamp a wire against the conductor 14. The upper end of the conductor 14 extends forwardly away from the block 7 and is then bent rearwardly to form a cylindrical bearing 21, the forward side of the bearing being provided with a central circumferential slot 22. Mounted in the bearing 21 is a cylindrical head 23 and threaded into the cylindrical head through the slot 22 is a shank 24 having a head 26 fast to its forward end. The conductor 15 has a forward part extending approximately parallel to the block 7, the lower end of this forward part overlapping the upper end of the conductor 14 but being spaced therefrom as shown in Fig. 3. The lower end of said part is provided with a slot 26 to receive the shank 24 and means 27 are provided to connect the conductor 15 with a conductor 28 leading to the meter.

When the connector 24 is in the position shown in Fig. 3 the circuit is open. To close the circuit the connector is swung to a position perpendicular to the block 7 and then threaded into the cylinder 23 to clamp the conductor 15 against the conductor 14. The head 26 seats flatwise on the upper side of strap 15, the cylindrical head 23 engages the cylindrical bearing of strap 14 throughout almost its entire circumference and of course the parts are drawn tightly together when the connector is threaded into the head 23. Thus excellent conductivity is established. Moreover the flexibility of the conductor 25 tends to pull the heads away from each other thereby eliminating the need of a lock-washer to prevent accidental rotation of the head 26 even when it is not tightly seated in clamping position. To open the circuit it is necessary merely to loosen the connector 24 and swing it to the position shown in Fig. 3, the flexibility of the conductor 25 opening the circuit automatically and abruptly. After the circuits have been opened the meter may be tested in the usual way by connecting the test apparatus to the posts 19 and 27.

Figure 5:
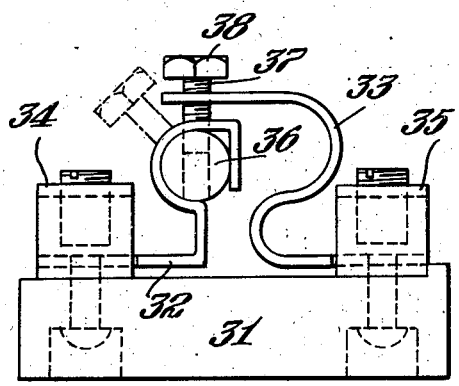

The modification shown in Figs. 4 and 5 comprises a block 31 carrying two conductors 32 and 33 and terminal posts 34 and 35. The forward end of the conductor 32 is shaped to form a bearing which is cylindrical throughout 180°. Fitting in the bearing is a cylindrical head 36 and threaded into the head 36 is a shank 37 having a head 38. To open the circuit the shank 37 is unscrewed to the position shown in Fig. 5 and then swung to the broken line position. By shaping the conductor 33 as shown in Fig. 5 it has somewhat more flexibility than the corresponding conductor 15 in the first embodiment.

Figure 6:
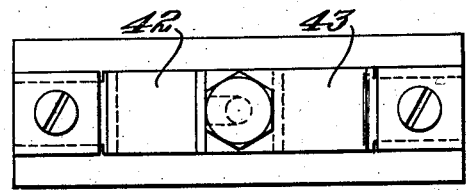
Figs. 6 and 7 are top and side views of another modified test block.
Figure 7:
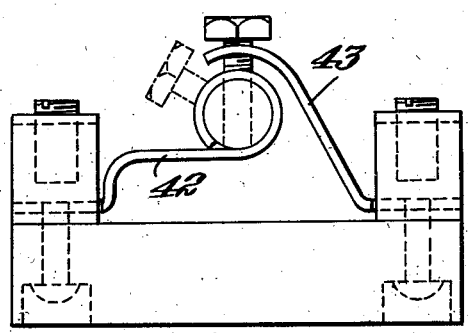

The modification shown in Figs. 6 and 7 is like that shown in Figs. 4 and 5 except in that the conductors 42 and 43 are shaped differently to make a device which is somewhat more compact and in which each conductor is flexible toward and from the other.

Figure 8:
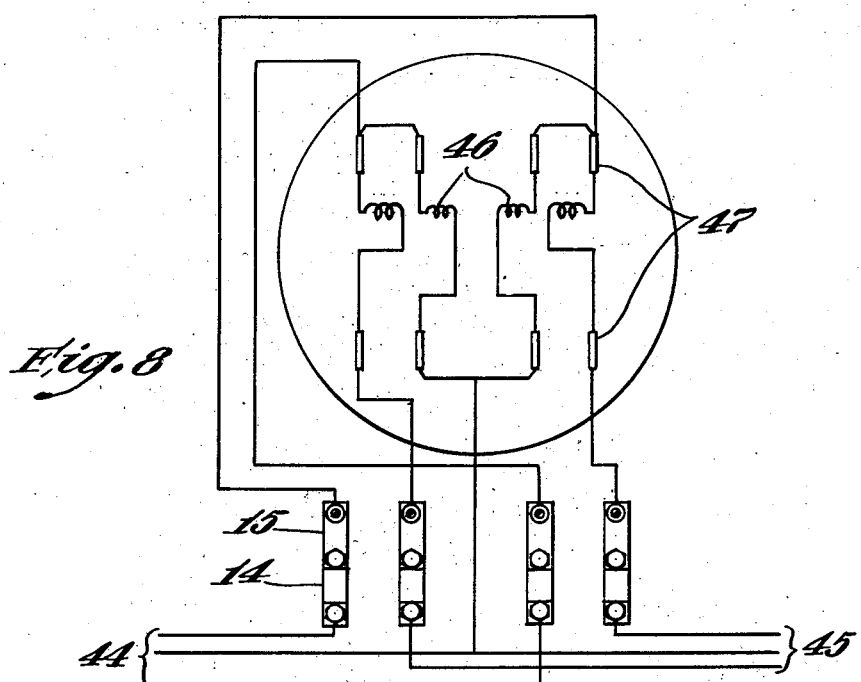
Fig. 8 is a circuit diagram.

In the circuit diagram shown in Fig. 8, 14 and 15 represent the conductors 14 and 15 of the first embodiment or the conductors 32 and 33 of the second embodiment or the conductors 42 and 43 of the third embodiment. The three conductors 44 constitute the supply circuit and the conductors 45 constitute the load circuit. The meter coils are indicated at 46 and the connections between the meter and the meter socket are indicated at 47, the illustration involving a meter of the plug-in type.

From the foregoing it will be evident that the connector may be removed merely by unscrewing the bolt from the cylindrical head and then slipping the head endwise out of its bearing. Thus the connector, which is the part of the block subjected to the most wear, may be replaced easily without disassembling the entire block.

An important feature of the invention consists in that the terminal conductors (14 and 15 or 32 and 33 or 42 and 43) engage each other so that current may flow directly from one to the other through only a single junction. Thus the connection offers less resistance to current flow than in prior terminal blocks where the current must flow through an intermediate conductor and therefore through two junctions.

Another advantage consists in that, while the terminal conductors are slotted, the cross-sectional area of the current path is nowhere less than the full cross-sectional area of the conductors.

Constructions like those of Figs. 4 to 7 afford the further advantage that the two terminal conductors have correspondingly shaped faces disposed in approximate parallelism so that contact is established throughout a wide area when the two conductors are clamped together in face to face contact.

From the foregoing it will be understood that the cylindrical portions of the aforesaid cylindrical bearings and heads need not extend through 180°. Thus in Fig. 5 the cylindrical portion of the bearing in strap 32 extends only through approximately 180°. However it is desirable that substantial portions of the parts be cylindrical to provide better electrical contact and to guide the swinging movement more accurately.

It should be understood that the present disclosure is for the purpose of illustration only and that this invention includes all modifications and equivalents which fall within the scope of the appended claims.

I claim:

1. An electrical terminal block comprising first and second conductors, means for supporting the conductors in spaced relationship with one conductor overlapping the end of the other conductor, said end having a recess, a connector pivotally mounted on the first conductor to swing into and out of said recess, a head on the connector which overlaps the second conductor when the connector is swung into said recess, and means on the connector for moving said head toward the first conductor to clamp the second conductor between the head and the first conductor, one of the conductors being flexible to permit it to move toward the other conductor in response to said movement of the head.

2. An electrical terminal block comprising two conductors, means for supporting the conductors in spaced overlapping relationship, and a connector including two heads and a connecting shank joined to one head by a threaded connection, one head being cylindrical and one conductor having a cylindrical bearing in which the cylindrical head rotates to swing the other head into and out of overlapping relation to the other conductor, one conductor being flexible to permit it to move toward the other conductor when the heads are drawn toward each other by said threaded connection, whereby the two conductors may be clamped together in good conducting relationship or permitted to spring apart in open circuit relationship.

3. An electrical terminal block comprising two conductors, means for supporting the conductors in spaced overlapping relationship, and a connector including two heads and a connecting shank joined to one head by a threaded connection, one head being cylindrical and one conductor comprising a strap bent into a cylindrical bearing in which the cylindrical head rotates to swing the other head into and out of overlapping relation to the other conductor, one conductor being flexible to permit it to move toward the other conductor when the heads are drawn toward each other by said threaded connection, whereby the two conductors may be clamped together in good conducting relationship or permitted to spring apart in open circuit relationship.

4. An electrical terminal block comprising two conductors, means for supporting the conductors in spaced overlapping relationship, and a connector including two heads and a connecting shank, one head being cylindrical and one conductor having a cylindrical bearing in which the cylindrical head rotates to swing the other head into and out of overlapping relation to the other conductor, one conductor being flexible to permit it to move toward the other conductor when the heads are drawn toward each other by said threaded connection and said shank extending through a circumferential slot in said bearing and threading into the cylindrical whereby the cylindrical head may be slipped endwise out of said cylindrical bearing after the shank has been threaded out of the cylindrical head.

5. An electrical terminal block comprising two conductors having contact faces, means for supporting the conductors in spaced overlapping relationship with said faces opposed to each other, a connector pivotally mounted on one conductor to swing into and out of conducting position relative to the other conductor, a head on the connector which overlaps the second conductor when the connector is swung into said conducting position, and means on the connector for moving said head toward the first conductor to clamp said faces in direct contact with each other, one of the conductors being flexible to permit it to move toward the other conductor in response to said movement of the head.

6. An electrical terminal block comprising two conductors having correspondingly shaped faces, means for supporting the conductors in spaced overlapping relationship with said faces opposed to each other, a connector pivotally mounted on one conductor to swing into and out of conducting position relative to the other conductor, a head on the connector which overlaps the second conductor when the connector is swung into said conducting position, and means on the connector for moving said head toward the first conductor to clamp said faces in direct contact with each other, one of the conductors being flexible to permit it to move toward the other conductor in response to said movement of the head.

7. An electrical terminal block comprising two conductors having correspondingly shaped faces, means for supporting the conductors in spaced overlapping relationship with said faces opposed to each other in approximate parallelism, a connector pivotally mounted on one conductor to swing into and out of conducting position relative to the other conductor, a head on the connector which overlaps the second conductor when the connector is swung into said conducting position, and means on the connector for moving said head toward the first conductor to clamp said faces in direct contact with each other, one of the conductors being flexible to permit it to move toward the other conductor in response to said movement of the head.

8. An electrical terminal block comprising two conductors, means for supporting the conductors in spaced overlapping relationship, and a connector including two heads and a connecting shank, one conductor comprising a strap bent into a bearing and one of said heads being mounted in the bearing to swing into and out of overlapping relation to the other conductor.

9. An electrical terminal block comprising two conductors, means for supporting the conductors in spaced overlapping relationship, and a connector including two heads and a connecting shank, one conductor comprising a strap bent into a bearing and the other conductor having a slot extending into it from one edge, one of said heads being mounted in said bearing to swing said shank lengthwise of said slot.

10. An electrical terminal block comprising two conductors, means for supporting the conductors in spaced overlapping relationship, and a connector including two heads and a connecting shank, one conductor comprising a strap bent into a bearing, one of said heads being mounted in the bearing to swing into and out of overlapping relation to the other conductor, and means for moving one of said heads toward the other to clamp the two conductors together.

11. An electrical terminal block comprising two conductors, means for supporting the conductors in spaced overlapping relationship, and a connector including two heads and a connecting shank, one conductor comprising a strap bent into a bearing and the other conductor having a slot extending into it from one edge, one of said heads being mounted in said bearing to swing said shank lengthwise of said slot, and means for moving one of said heads toward the other to clamp the two conductors together.

ERNEST G. JOHANSSON.